United States Patent [19]
Girard et al.

[11] Patent Number: 5,268,136
[45] Date of Patent: Dec. 7, 1993

[54] METHOD FOR THE MANUFACTURE OF PLASTIC SHEETS OF GOOD OPTICAL QUALITY

[75] Inventors: Philippe Girard, Evreux; Jean-Marc Petitcollin; Dany-Ange Plebani, both of Thourotte, all of France

[73] Assignee: Saint-Gobain Vitrage International, Courbevoie, France

[21] Appl. No.: 814,089

[22] Filed: Dec. 24, 1991

Related U.S. Application Data

[63] Continuation of Ser. No. 384,060, Jul. 24, 1989, abandoned, which is a continuation of Ser. No. 102,792, Sep. 23, 1987, abandoned, which is a continuation of Ser. No. 842,370, Mar. 19, 1986, abandoned, which is a continuation of Ser. No. 673,833, Nov. 21, 1984, abandoned, which is a continuation-in-part of Ser. No. 589,047, Mar. 14, 1984, abandoned, which is a continuation of Ser. No. 252,509, Apr. 9, 1981, abandoned.

[30] Foreign Application Priority Data

Apr. 17, 1980 [FR] France .................. 80 08627

[51] Int. Cl.⁵ ............................................. B29D 7/01
[52] U.S. Cl. ............................. 264/216; 264/1.6; 264/290.2; 264/316; 264/DIG. 65; 264/166
[58] Field of Search .............. 264/216, 213, 212, 39, 264/1.1, 1.6, 290.2, DIG. 65, 316, 166; 425/89, 223, 224

[56] References Cited

U.S. PATENT DOCUMENTS

| | | |
|---|---|---|
| 2,781,078 | 2/1957 | Dovidio . |
| 3,161,710 | 12/1964 | Turner ................ 264/216 |
| 3,256,379 | 6/1966 | Heffelfinger ........ 264/290.2 |
| 3,322,598 | 5/1967 | Marks et al. . |
| 3,418,785 | 12/1968 | Duryee . |
| 3,462,909 | 8/1969 | Anderson . |
| 3,523,397 | 8/1970 | Carey et al. . |
| 3,600,490 | 8/1971 | Billingsley et al. ........... 264/213 |
| 3,990,876 | 11/1976 | Heymis et al. ............. 264/174 |
| 4,010,311 | 3/1977 | Lewis et al. ............... 428/424 |
| 4,041,120 | 8/1977 | Othima et al. ............. 264/171 |
| 4,254,074 | 3/1981 | Toyooka et al. ............ 264/132 |

FOREIGN PATENT DOCUMENTS

| | | |
|---|---|---|
| 1011519 | 6/1977 | Canada . |
| 1599971 | 8/1970 | France . |
| 2366321 | 4/1978 | France . |
| 2404502 | 4/1979 | France . |
| 321189 | 8/1929 | United Kingdom . |

Primary Examiner—Jeffery Thurlow
Assistant Examiner—Mathieu Vargot
Attorney, Agent, or Firm—Oblon, Spivak, McClelland, Maier & Neustadt

[57] ABSTRACT

Plastic sheets of good optical quality suitable for use in the glazings of automotive vehicles, eye glasses etc., are made by depositing a hardenable liquid mass upon a taut moving ribbon of plastic which has been pretreated by tensioning and heating to remove wrinkles and creases which otherwise would render optically unsatisfactory the sheet formed on the ribbon upon hardening of the liquid mass. The temperature range within which the pretreatment should be conducted is 60°-100° C., with 70°-90° C. being preferred; the tension applied in the pretreatment should be a dekanewton or more per square millimeter, preferably 1.5-7.5 dekanewtons per mm²; and the time of pretreatment is at least a minute and preferably 5 or more minutes. The lateral tension is preferably applied by means of pairs of opposed idler rollers positioned along the opposite side edges of the moving ribbon and biased toward each other to pinch the ribbon between them, with their axes angled outwardly by a few degrees from a direction normal to the direction of travel of the ribbon. The pretreatment heating is preferably applied in two successive ovens providing successive temperatures of about 70° and 90° C., respectively.

11 Claims, 3 Drawing Sheets

METHOD FOR THE MANUFACTURE OF PLASTIC SHEETS OF GOOD OPTICAL QUALITY

REFERENCE TO RELATED APPLICATIONS

This application is a continuation of application Ser. No. 07/384,060, filed on Jul. 24, 1989, now abandoned which is a continuation of Ser. No. 07/102,792, filed on Sep. 23, 1987, now abandoned; which is a continuation of Ser. No. 06/842,370, filed on Mar. 19, 1986, now abandoned; which is a continuation of Ser. No. 06/673,833, filed on Nov. 21, 1984, abandoned; which is a continuation-in-part of Ser. No. 06/589,047, filed on Mar. 14, 1984, now abandoned; which is a continuation of Ser. No. 06/252,509, filed on Apr. 9, 1981 now abandoned.

BACKGROUND OF THE INVENTION

The present invention relates to the manufacture of plastic sheets of good optical quality, and especially to improvements in methods and apparatus for making such sheets by depositing a liquid mass upon a moving substrate to form a liquid layer, causing said layer to solidify on said substrate to form a plastic sheet, and thereafter removing said sheet from the substrate.

The terms "plastic sheet" or "sheet" are used herein to include a thin film made up of one or more layers of a resinous or polymeric material, as well as a thicker film or plate formed from one or more such layers.

There are a variety of applications in which it is desired to produce a sheet of resinous or polymeric material of good optical quality, i.e. one which is transparent and homogeneous in its optical properties over its full useful area. In general, this means that it should be as free as possible of optical defects throughout its thickness and at its opposite surfaces, and that such opposite surfaces should be of precise predetermined configurations, usually flat and parallel to each other. One application with respect to which the invention will be described with particularity is in the manufacture of anti-lacerative, self-healing plastic sheets useful on glazings of various types.

An important example of such use arises in connection with the glass windows of motor vehicles—especially the windshields thereof—where severe lacerations of the face or other parts of the body of a driver or passenger by sharp particles of glass frequently result when a window is shattered in an accident. Such problems can be obviated by use of an anti-lacerative plastic sheet adhered to the inner side of the glass window, which sheet serves to shield and protect passenger and driver from the sharp edges of the broken glass. An improved safety windshield incorporating an anti-lacerative, self-healing plastic sheet is described in U.S. Pat. No. 4,232,080 of Roger Orain et al, issued Nov. 4, 1980 and assigned to the same assignee as the present invention.

It is desirable in many cases that such anti-lacerative sheet not be susceptible to permanent marring or scratching in normal use, and in some cases it is desirable that it be energy-absorbent in the sense that it will take up or absorb energy of an impact with the head or other part of a passenger or driver, for example by stretching so as to cushion the shock of such impact. Anti-lacerative sheets having self-healing properties are now known, and such sheets which are energy-absorbent have also been proposed.

An excellent material for use in preparing a self-healing, anti-lacerative sheet is described in U.S. Pat. No. 3,979,548 of Helmer Raedisch et al, issued Sep. 7, 1976 and assigned to the same assignee as the present invention.

To aid in attaching such thermosetting polyurethane sheets to glass, it is known to make the sheet in the form of a two-ply laminate made up of a ply of thermosetting polyurethane having self-healing, anti-lacerative properties, and a ply of a thermoplastic polyurethane bonded to the thermosetting sheet, the thermoplastic ply being non-tacky at room temperature but softening at an elevated temperature to function as an adhesive; when the sheet is heated, its thermoplastic ply pressed against the glass, and the sheet then cooled in situ, the thermoplastic ply forms a good bond with the glass. Such a two-ply sheet is described and claimed in U.S. patent application Ser. No. 70,732 of H. Agethen et al, filed Aug. 29, 1979, now abandoned. An especially advantageous form of the adhesion-providing ply, which includes the use of a a blocked polyurethane, is described and claimed in U.S. patent application Ser. No. 213,225 of Gerard Daude et al, filed Dec. 5, 1980. The disclosures of these applications, each of which is assigned to the same assignee as the present invention, is incorporated herein by reference. Such anti-lacerative, self-healing monoply and multi-ply sheets are also suitable for use on the glazings of eye glasses, goggles, windows of buildings, etc.

It is known to manufacture sheets of the above-described type by depositing a liquid material on a polished metal drum of large diameter, or on endless metal strips having polished surfaces, followed by heating to produce evaporation of the solvent(s) and/or to produce a polymerization reaction and a solidification of the plastics material in situ on the substrate. The sheet so-formed is then removed from the substrate for subsequent use.

This process is not without drawbacks, since the quality of the polish of the substrate is adversely affected by its continuous reutilization. Consequently, the optical quality of the sheet diminishes as the substrate wears down due to reuse.

It is also known to manufacture such plastic sheet by casting a liquid mass on a substrate formed by a succession of contiguous sheets of glass, as described in U.S. Pat. No. 4,136,214 of Claude Bourelier et al, issued Jan. 23, 1979, also assigned to the same assignee as the present invention. These sheets of glass are also re-used, and after repeated use, their surface becomes marred by scratches and other surface defects which require their replacement to avoid substantial optical defects in the sheet of plastic material so made. In such a process, the presence of joints between the sheets of glass also creates difficulties. Furthermore, the implementation of the process requires a substantial consumption of energy since it is necessary to heat up the thick glass substrate as it moves through the deposition and treatment zones.

To prevent alteration of the optical quality of the sheet of plastic material through wear or surface damage to the casting substrate, it has been proposed to cast the liquid material on an endless ribbon of glass, which is placed in continuous motion in a horizontal position immediately after the making of the glass ribbon by the float method, for example, as described in U.S. Pat. No. 3,990,876 of Pierre R. Heymes et al issued Nov. 9, 1976, also assigned to the same assignee as the present invention. This ensures the continuous availability of a fresh casting surface free from defects. This process has the drawback that it lacks versatility and economy since the glass-ribbon producing units are of substantial size and expense, and their use can only be envisioned in large-scale production of sheets of plastic material, with large capital and operating costs. In addition, it again requires substantial energy and time to change the temperature of the glass ribbon as required, as it passes through the deposition, solidifying and cooling zones of the sheet-forming apparatus.

Accordingly, it is an object of the invention to provide a new and useful method and apparatus for the manufacture of plastic sheets of good optical quality, and to provide such sheets of consistent good quality at reduced manufacturing expense by a process which requires less energy consumption and processing time than other previously-known processes.

SUMMARY OF THE INVENTION

These and other objects of the invention are achieved by the provision of a method and apparatus in which a plastic sheet of good optical quality is made by applying a liquid mass, capable of solidifying to form the desired sheet, to a thin pliant ribbon while the ribbon is held taut and smooth by tensioning forces applied thereto and, prior to said depositing, subjecting said ribbon to a pretreatment comprising tensioning it laterally and longitudinally while heating it, for a sufficient time to remove substantially all wrinkles and creases therefrom. The thin pliant ribbon is preferably of a suitable plastic material, and it is preferably supported from beneath at the position where the liquid mass is being supplied to its top surface. For best results the pretreatment temperature should be maintained between 60° C. and 100° C. for at least a minute, preferably for five minutes or more, while applying to it tensions of at least several dekanewtons per square millimeter of ribbon cross section.

The liquid layer thus produced on the ribbon is then caused to solidify to provide the desired sheet with a smooth inner surface in contact with the ribbon. The ribbon with the solidified sheet on it may, if desired, be rolled up, with the ribbon serving as an isolating interlayer between the successive layers of sheets in the roll for later separation from the sheets when they are to be put into use; or, the sheet may be removed from the ribbon by peeling it away from the ribbon before such rolling-up.

The ribbon is preferably maintained in continuous longitudinal motion during the pretreatment and during the deposition and solidifying steps, and to maintain the desired lateral tension, rollers disposed at an angle to the direction of motion of the ribbon are preferably applied to opposite marginal portions of the ribbon.

When a multi-ply sheet is to be made, one or more additional plies may be formed on the first ply by depositing another liquid mass of appropriate material onto the solidified first ply at a position on the ribbon downstream from the position at which the first ply is solidified, and allowing the added layer to solidify in situ in the same general manner in which the first solidified ply was formed. In one principal application of the invention, the sheet, or one ply thereof, is of an anti-lacerative, self-healing, thermosetting material described in more detail hereinafter, and in a preferred embodiment another ply of the same sheet is provided as described above, and is of a thermoplastic material having adhesive properties when heated, selected from the group of such materials also set forth hereinafter.

In various preferred embodiments of the invention, one or a combination of the following more specific features thereof may also be used.

Preferably, the ribbon is of a plastic material having a thickness from about 0.01 to about 0.25 mm, and is constituted of either polyethyleneglycol terephthalate or of regenerated cellulose, suitable forms of which materials are available under the names "TERPHANE" or "MYLAR", and "CELLOPHANE", respectively. In a typical application of the invention for use on vehicle windshields, for example, the ribbon may be about 1 meter or more in width, and thus at least about 100,000 times greater in width than in thickness. Being thin, the ribbon is inexpensive and can easily be rolled up or folded in handling as required, and being pliant it can readily be unfolded. Preferably the ribbon material is somewhat elastic, so it will elongate somewhat in response to tensioning thereof, which is an aid in maintaining it taut as it is subjected to different temperatures during the sheet-forming steps. The pretreatment to remove wrinkles is preferably conducted at a temperature of from about 70° C. to about 90° C. for about 5 to about 8 minutes, with the axes of the rollers angled outwardly at from about 2° to about 5° from the normal to the direction of ribbon motion.

In a preferred embodiment the ribbon is initially wound on a supply bobbin, and is continuously pulled therefrom along a horizontal run by and to a driven traction roller, and the ribbon is ultimately wound up onto the roller. The force exerted by the traction roller in pulling on the ribbon is resisted by the resistance to rotation of the supply bobbin, and/or by the friction exerted on the ribbon by system elements between supply bobbin and traction roller, so as to produce the desired longitudinal tensioning of the ribbon. As mentioned above, lateral tensioning of the ribbon is also provided, preferably by means of sets of rollers acting on the opposite edge portions of the ribbon in a laterally outward direction, as may be accomplished by angling the rollers laterally outwardly with respect to the ribbon as viewed along the direction of motion of the ribbon. In such case, the pressure applied by the rollers is preferably at least several dekanewtons per square millimeter. The ribbon may extend through one or more liquid-mass depositing stations, which may be slit-type liquid dispensers, and through corresponding one or more downstream ovens for heating the deposited liquid layer to cause it to solidify.

If a supporting surface is used below the ribbon, at least at the positions where the liquid mass is deposited, it may be constituted of one or more stationary flat plates of glass. Preferably, a release agent is used on the ribbon beneath the deposited liquid layer to aid in easy removal of the solidified sheet from the ribbon; in one preferred embodiment, the release agent is one which adheres to the sheet formed thereon, and remains adhered to the sheet when the latter is removed from the ribbon prior to winding up of the ribbon. For this purpose, the release agent may, for example, be poly(vinyl alcohol), which remains adhered to the sheet until the sheet is to be used, at which time the poly(vinyl alcohol) layer may be washed off.

Since the method and apparatus of the invention require only an inexpensive pliant ribbon as moving substrate, complex and expensive apparatus for producing and continuously moving a heavy stiff substrate of expensive material, e.g. glass, is not required. Further, the thin pliant ribbon is easily heated and cooled as it moves through the various treatment zones, without requiring the amount of heat energy and time which are necessary when a relatively thick moving glass substrate is used. Nevertheless, the combination of the tensioned smooth ribbon with the support beneath it produces cast plastic sheets having the smooth predetermined surface configuration desired for good optical quality.

BRIEF DESCRIPTION OF FIGURERS

These and other objects and features of the invention will be more fully understood from a consideration of the following detailed description taken with the accompanying drawings, in which.

DETAILED DESCRIPTION OF PREFERRED EMBODIMENTS

Figures 1, 6, 7:
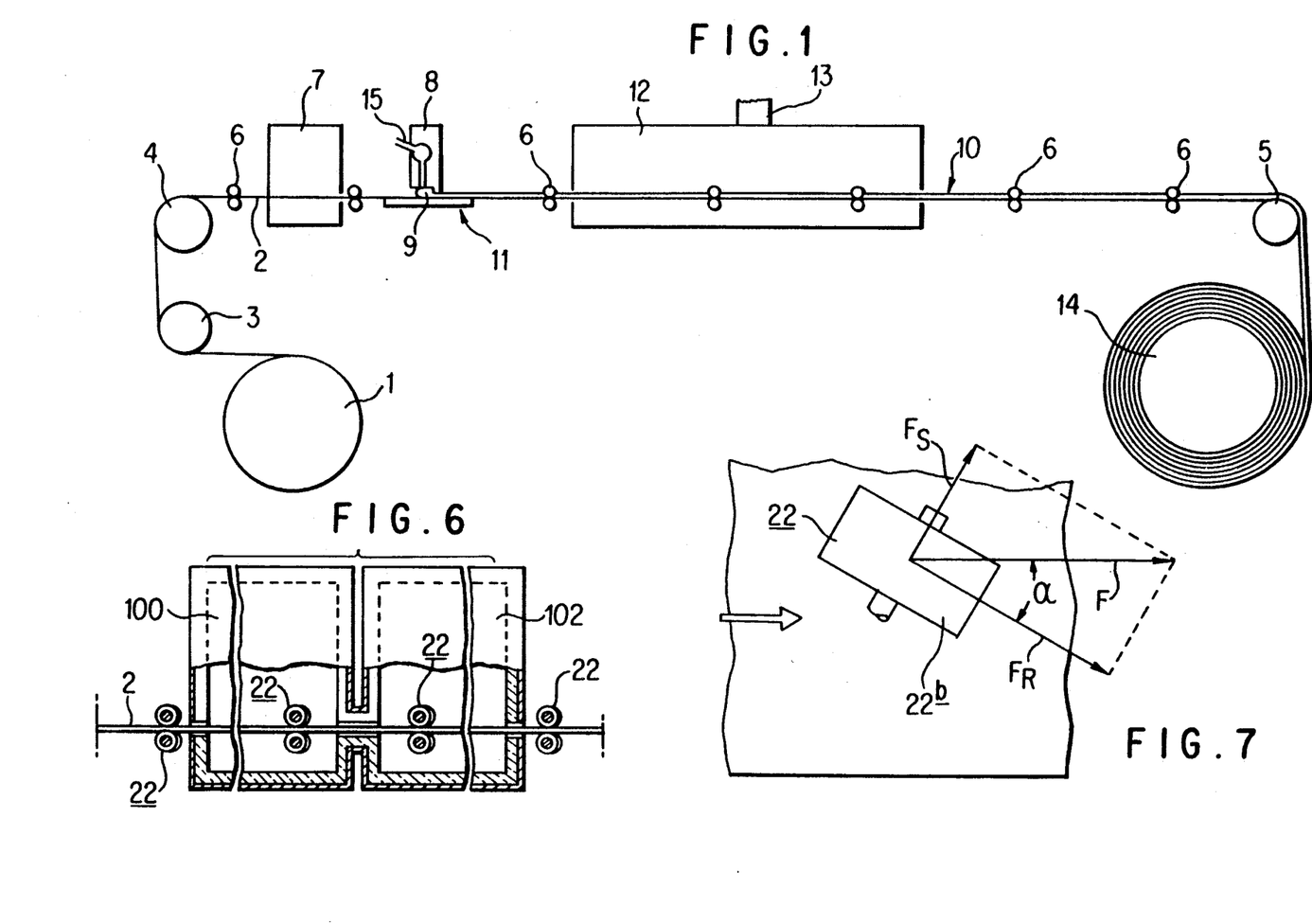
FIG. 1 is a diagrammatic side view of a system for making a single-ply plastic sheet according to one embodiment of the invention.
FIG. 6 is a diagrammatic side view, with parts broken away, illustrating a presently-preferred double-chamber system for effecting pretreatment of the ribbon.
FIG. 7 is a schematic drawing to which reference will be made in explaining certain significant operating conditions for the invention in its preferred form.

Referring first to the embodiment of FIG. 1, the casting line for making the plastic sheets consists in this example of a supply bobbin 1 for supplying a ribbon 2 about 1.30 meters in width and about 0.023 mm thick, made of polyethlyeneglycol terephthalate, for example the product which has been marketed by RHONE POULENC under the trademark "TERPHANE".

After travelling around the direction-reversing rollers 3,4 which, if need be, may also serve as wrinkle-removing rollers for the larger wrinkles, the ribbon 2 extends along a long horizontal run to a traction roller 5 located at the downstream end of the production line; this roller longitudinally tensions and stretches the ribbon, and causes it to move forward at a uniform rate. Pairs of wheels 6 are provided at regular intervals along each side margin of the ribbon, at an angle with respect to the direction of forward movement of the ribbon, and serve to clamp the edge portions of said ribbon between them while exerting on the latter portions a force having lateral components directed towards the edges of the ribbon, to provide the desired lateral tensioning of the ribbon.

Under the simultaneous effects of the traction roller 5, whose rubberized surface provides the necessary frictional contact with the ribbon surface, and of the angled rollers, the ribbon is tensioned and stretched taut both longitudinally and laterally, so as to lie substantially in a horizontal plane.

Near the beginning of the casting line and above the ribbon 2, a conventional casting head 8 with a wide thin dispenser slot serves to dispense the liquid mass 9 in a uniform and controlled manner suitable for forming the sheet of plastic material 10. A suitable casting head is for example that described in French Patent No. 2,347,170 of Rudolf Pelzer and Heinz Scholl, issued Jan. 11, 1980.

Upstream of the casting head, the ribbon traverses a preheating chamber 7 preferably equipped with an electrical resistance heater, wherein the ribbon is tensioned longitudinally and laterally while being heated to sufficiently high temperature for a sufficiently long time to smooth out any wrinkles, and preferably also to reduce any "orange-peel" pitting present at its surface.

Below the casting head 8, and under the stretched ribbon 2, a stationary flat horizontal plate 11 of adequate thickness, made of smooth-surfaced glass, for example, maintains the ribbon in a horizontal position despite the weight of the liquid mass. The plate may be heated by an electrical resistance heater to permit, should the need arise, raising the temperature of the ribbon by conduction in order to provide said ribbon with the ideal conditions of temperature adapted to the casting of the plastic material.

Downstream from the casting head, the ribbon traverses a polymerization chamber or oven 12, the role of which is to raise the temperature of the cast layer sufficiently to cause it to solidify, either by simple evaporation therefrom of the volatile liquids, which escape through a suction pipe 13, or by polymerization of the components of the cast liquid mass, or both. Downstream from the drying oven 12, the ribbon 2 continues to travel, while stretched, over a sufficient distance to permit cooling and solidification of the deposited layer, thus forming the desired plastic sheet.

At the end of the production line, the apparatus includes a wind-up roller 14, around which the ribbon 2 with the sheet of plastic material thereon is wound.

The lengths of the various zones—e.g. the heating zone and cooling zone—of the casting line depend on the nature and dimensions of the sheet to be formed.

In other embodiments the means supporting the flexible pliant ribbon, with the exception generally of the area or areas where the material is cast, are metal wires stretched between two horizontal bars laterally positioned on both sides of the casting line. These wires may be placed at given distances from one another, these distances being generally smaller just downstream of the area of casting where the cast material is still very fluid. One of the advantages of using metal wires relates to the fact that friction between the casting ribbon and these wires is greatly reduced and the static electricity created as a result of such friction also substantially reduced. The conductive wires also tend to eliminate these electrical charges. Another advantage of using metal wires relates to the fact that this makes it possible to eliminate the tendency of particles of dust to lodge themselves between the rigid support plates and the stretched flexible ribbon, especially since these dust particles could damage the flexible ribbon or produce surface defects on the cast layers.

The operation of the apparatus will now be described as applied to the production of a layer of plastic material consisting primarily of a blocked polyurethane which can be used as an adhesive layer in a laminated glazing.

To make this layer, a blocked polyurethane solution or dispersion is prepared in advance by using an excess of isocyanate compound in a manner known per se, and by blocking the free NCO functions with a blocking agent. Suitable materials for the solution or dispersion are known, and are set forth hereinafter.

To form the plastic sheet, the traction roller 5 is started, thus placing the flexible ribbon 2 under tension and causing it to move forward at a rate of about 0.5 meter per minute in this example. The flexible ribbon is stretched between the upstream roller 4 and the traction roller 5, while its edges are held and tensioned laterally by wheels or rollers 6. The length of the entire line in this case is about 5 meters.

In chamber 7 upstream of the casting heads, the ribbon is heated to a temperature preferably of about 70°-90° C.; this heat, combined with the tension acting on the ribbon, provides the ribbon with a smooth, unwrinkled surface prior to its arrival at the polymerization chamber.

Conduit 15 delivers the previously-prepared aqueous polyurethane solution or dispersion to the casting head 8. The liquid mass delivered by the casting head forms, on the stretched pliant ribbon, a liquid layer of uniform thickness measuring about 1 meter in width, which solidifies progressively into a solid layer 10 by evaporation of its water content while travelling through the heating oven 12 having an inside temperature of about 120° C. Upon emerging from the heating oven, the layer of material is completely solidified and of uniform thickness, typically about 0.03 mm. It cools in the air before being wound onto the bobbin 14 together with the TERPHANE substrate, which serves as interlayer.

Figures 2, 3:
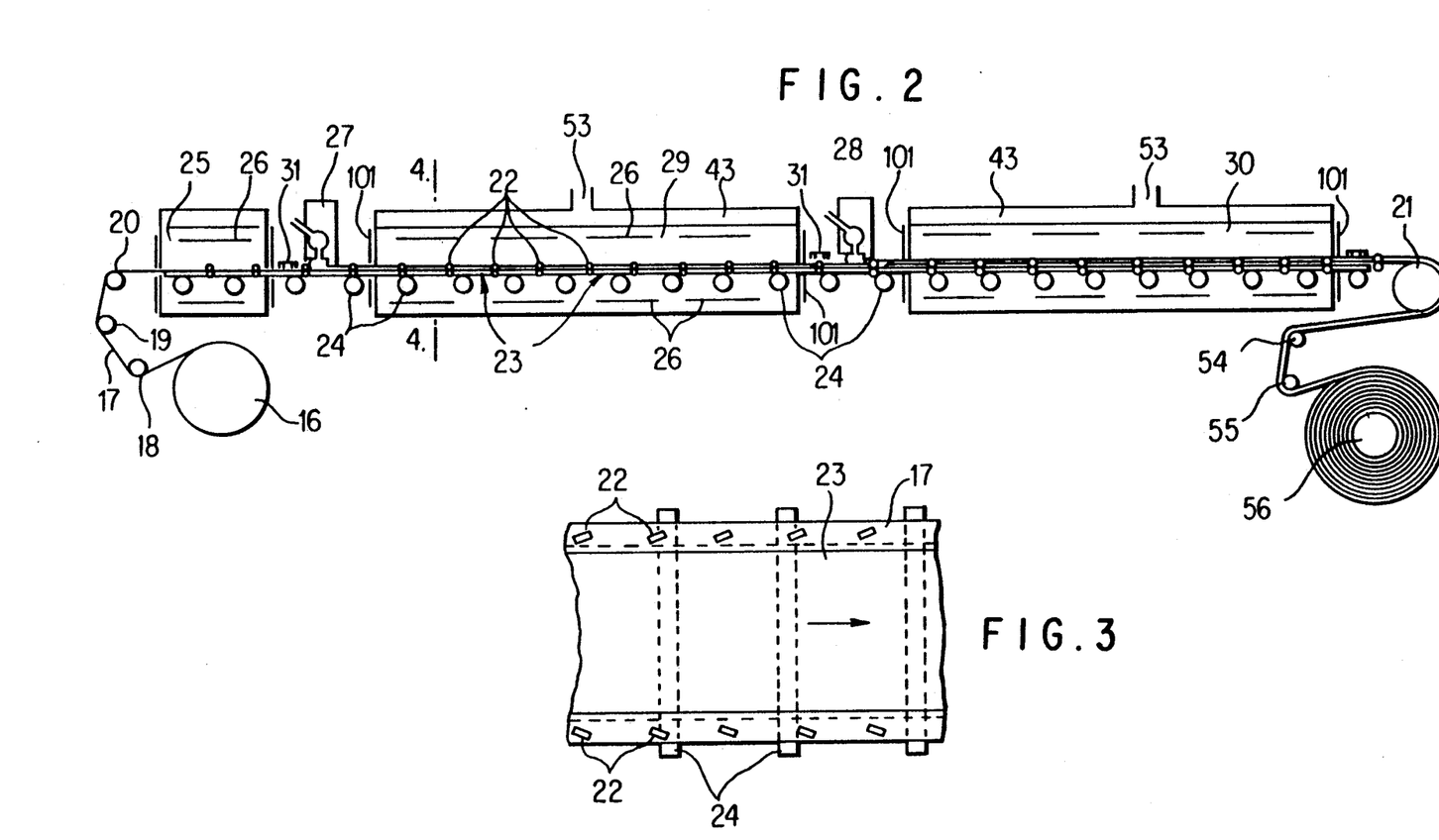
FIG. 2 is a diagrammatic side view of another system, in accordance with the invention, for making a multiply plastic sheet.
FIG. 3 is a fragmentary plan view of a portion of the system of FIG. 2, showing an arrangement of a pliant ribbon and angled wheels for providing lateral tensioning of the ribbon.

FIG. 2 illustrates a variation of a production line according to the invention. This line is equipped to make a two-ply sheet of plastic material of high optical quality and, as in the preceding embodiment, includes a bobbin 16 delivering a ribbon 17 about 1.3 meters in width and about 0.03 mm thick, made of polyethyleneglycol terephthalate.

After travelling around the rollers 18, 19 and 20, the ribbon 17 is subjected to longitudinal traction by means of the traction roller 21 which stretches it and makes it move forward at a uniform rate of speed. The ribbon 17 is simultaneously subjected to lateral traction by means of pairs of wheels 22 provided along each side of the ribbon and angled slightly outwardly in relation to the direction of forward movement of said ribbon.

Over most of the length of the production line, the ribbon 17 is disposed above glass plates 23, which form a continuous immobile flat support resting on rollers 24 secured to a frame (not shown).

Upstream from the casting portion of the line, the ribbon travels through a preheating chamber 25 equipped with electrical resistance heaters such as 26 which heat the ribbon while tensioning it to make it smooth and free of wrinkles, creases and other surface irregularities. Downstream from this first heating chamber, the casting line has two casting heads 27 and 28 each with a wide thin dispenser slot, as in the preceding embodiment, each followed by a drying and solidification oven, 29 and 30 respectively. These ovens are formed of a series of caissons, as described hereinafter in reference to FIG. 4.

The casting line may in some cases include cleaning means for the elimination of dust and other particles which might otherwise be deposited on the supporting ribbon or on the layers of plastics material These means may include scrapers, brushes, wiping elements, and/or suction means (not shown).

Detectors (not shown) may be provided to detect the ribbon's position transversely; should lateral slippage of the ribbon occur, the detectors can then activate an automatic ribbon-centering device, for example by influencing the action of certain of the edge wheels.

Figure 4:
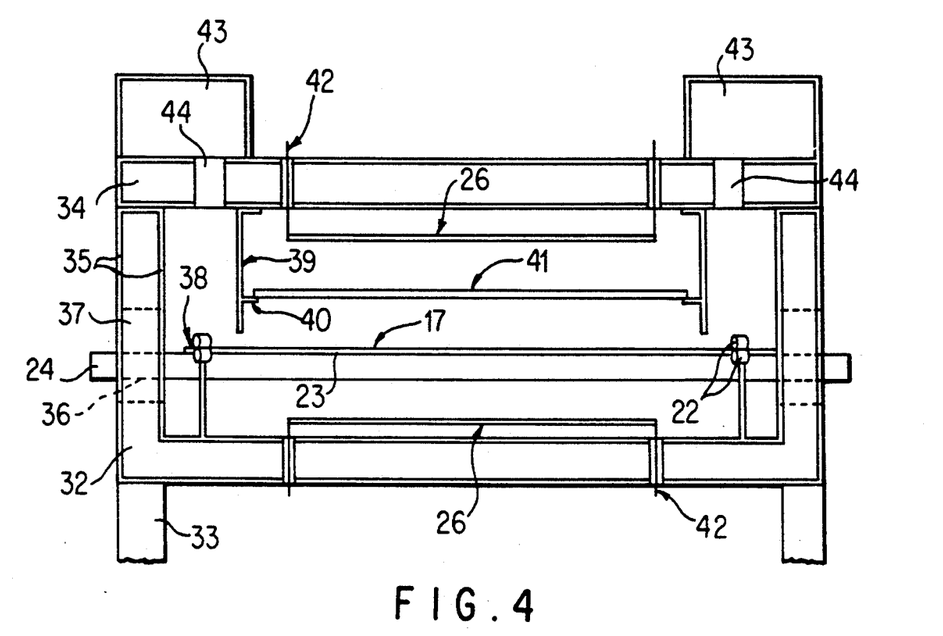
FIG. 4 is a diagrammatic cross-sectional view taken along lines IV—IV of FIG. 2.

FIG. 4 illustrates a section of a drying or solidification oven suitable for use in the practice of the invention. The oven consists of a series of caissons, the lower portion 32 of each of which is supported by a frame 33 and the upper portions 34 of which can be separated from the lower portions 32 to permit access to the ribbon 17, if necessary. Each of the caissons, at each end of the oven, has a vertical wall 101 with an opening therein for passage of the ribbon and the layer formed thereon.

The caissons are formed with double walls of sheet metal 35 filled with insulating material, and are provided with side openings 36 and 37 for passage of the rollers 24 which support the glass plates 23 placed beneath the ribbon 17, and for access to the wheels 22 to permit regulation of the latter. The wheels 22 grip the edge portions 38 of the ribbon 17 at about two centimeters from the edges thereof. Above the ribbon, the caisson is provided with vertical walls 39 which, by means of angle irons 40, support the upper glass plates such as 41 which form a protective tunnel against dust for the ribbon and for the sheets which have been formed or are in the process of being formed.

The electrical resistance heaters such as 26 are connected to a current supply source by conductors 42, and are located both above and below the ribbon. Depending on the nature of the layer to be formed, it may be preferred to heat only from above, only from below, or from both above and below.

The upper parts of the caissons are topped by a double ventilation channel 43, linked through openings 44 to the central part of the caisson, and through conduit 53 (FIG. 2) to ancillary suction means, not shown. The role of the double ventilation channel is to exhaust vapors from the solvents, or other volatile products, during the solidification of the layer of the sheet.

Figure 5:
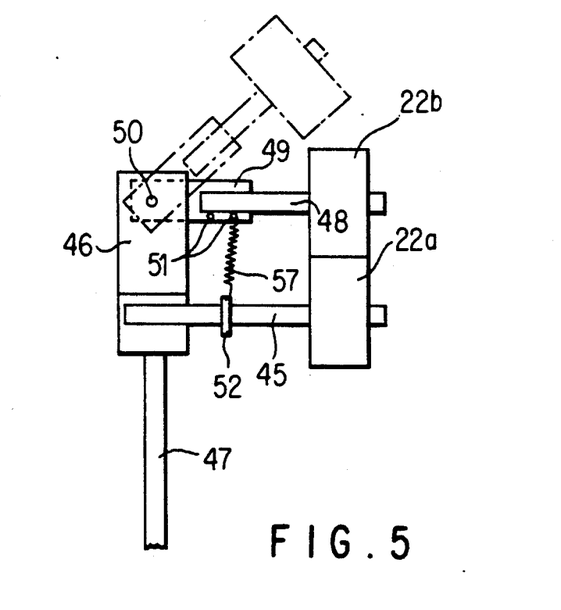
FIG. 5 is a diagrammatic end view showing an arrangement of the edge wheels used to provide lateral tensioning of the ribbon of the other figures.

FIG. 5 illustrates a typical pair of edge wheels 22 as used in the above-described embodiment. These rubber rollers or wheels are mounted on a ball-bearing assembly for rotation around axles, and in this example have a diameter of about 3 centimeters and a width of about 1 centimeter. The axle 45 of the lower wheel 22a is affixed to the frame 46, which in turn is mounted on top of a threaded rod 47 which permits adjustment of the height of the wheels and their angle about a vertical axis in relation to the frame of the apparatus. The axle 48 of the upper wheel 22b is affixed to a part 49 which is rotatable on frame 46 around a horizontal axis 50. When in the operating position, the two axles 45 and 48 are parallel to each other. The upper wheel 22b is shown in dashed line in an intermediate position between the operating position and the at-rest position.

Openings 51 in the pivoting part 48 and in the collar 52 of the lower axis 45 permit the optional attachment of springs 57 of various strengths to determine the force with which the wheels grip the ribbon.

The operation of the embodiment of FIGS. 2-5 of the apparatus will now be described as applied to the manufacture of a composite sheet of plastics material containing an anti-lacerative and self-healing layer formed primarily from thermosetting polyurethane and a thermoplastic layer with adhesive properties formed primarily from a blocked polyurethane as described above.

The TERPHANE ribbon 17 supplied by bobbin 16 travels around the rollers 18, 19 and 20 and is stretched and held taut and smooth longitudinally as a result of the traction exerted by the traction roller 21 and the resistance of the upstream rollers, the traction roller providing, in addition, a uniform forward motion of the ribbon at a rate of 0.5 meter per minute in this example; the pairs of wheels 22 maintain lateral tension, and are spaced 50 centimeters from one another, along each edge of the ribbon, for example.

While travelling through the chamber 25, the ribbon is heated by means of resistance heaters such as 26 to a temperature of 70°-90° C., while subjected to lateral and longitudinal tension, which completes the removal of any remaining creases in the ribbon and reduces any "orange peel" effect present in the surface of the ribbon. The temperature of the substrate is rendered uniform over the entire length of the casting line by use of the glass plates 23 and 41, heated to the desired temperature by means of the electrical resistance heaters 26.

Using the first casting head 27, the liquid mass capable of forming the layer with adhesive properties is applied, in this case using a solution or aqueous dispersion of blocked polyurethane. The applied layer then travels with the ribbon through the oven 29, which is maintained at a temperature of about 120° C. by means of the electrical resistance heaters 26. In the oven, the water is evaporated from the solution, the vapors being exhausted through the openings 44 and drawn off by the ventilation channel 43 topped by the exhaust pipe 53. Upon emerging from the oven 29, the solidified layer so-formed is about 0.02 millimeter in thickness.

A liquid mass containing a mixture of reactive compounds capable of forming the thermosetting polyurethane is applied on top of the first solidified layer by means of the second casting head 28.

The second layer is solidified by means of polymerization while travelling through the second oven 43 in which the temperature is maintained at about 100° C. Upon emerging from the oven 43, this second layer is solidified and has a thickness of about 0.5 mm. The resultant two-ply sheet is then cooled by the air. After travelling around the traction roller 21 and the rollers 54 and 55, the sheet is wound, together with the TERPHANE substrate, around the roller 56, and then stored.

This same casting line may be used in the manufacture of a two-ply plastic sheet as described in aforementioned application Ser. No. 70,732. In this case, the procedure is the same as above, but the first layer is formed by the casting of an organic solution of thermoplastic polyurethane, evaporating solvent from the solution as the ribbon is passed through a first drying oven, for example, at a temperature of about 100° C., and then forming thereon the second layer by applying thereto a liquid mass from which a thermoset polyurethane is formed.

This two-ply sheet can also be made using the production line of FIG. 2 by first forming a layer of thermosetting polyurethane and then, after at least partial polymerization of this layer, forming an adhesive layer on top of it. In this case, it is preferable to treat the support ribbon prior to the casting of the reactive compounds to avoid too strong a bond between the thermosetting layer subsequently formed and the substrate. Such a treatment may consist of applying a release agent spray, for example, an ethylene oxide addition product modified as described in French Patent No. 2,383,000 of Wolfgang Schafer et al, issued Sep. 7, 1979, before or after heating the ribbon. One can also form on the TERPHANE ribbon a film of poly(vinyl alcohol), which may in some cases replace the substrate as storage interlayer.

Using the production line of FIG. 2, it is also possible to make a two-ply sheet in which the two plies are of the same material, for example when one wishes to produce a sheet of greater thickness.

Other forms of production lines according to the invention may include different numbers of casting and drying positions, i.e. more than two. For example, to make a sheet of sufficient thickness to possess energy-absorbing properties, a multi-ply sheet may be formed by casting three, four, or more successive layers of thermoplastic polyurethane, for example, as described in French Patent No. 2,398,606 of Heinrich Agethen et al, issued Jan. 22, 1982, or of blocked polyurethane as previously described.

The plastic sheet made in accordance with the invention exhibits good optical quality and, consequently, may be used in the manufacture of laminated glazings such as glazings for motor vehicles, buildings, masks, screens, glasses, etc. The thin pliant ribbon used as substrate is easily and inexpensively made and stored, and may be economically discarded after a single use or used as a storage interlayer as described above. Further, due to the thinness of the ribbon, heat from the various heaters used in the process can readily flow through the ribbon to the underside of the deposited layer, thus reducing the amount of heat energy required in the process for heating the moving substrate.

The plastic material of which the ribbon 2 or 17 is formed should have appropriate surface qualities; in addition to being smooth when heated and stretched, it generally should be waterproof and inert with respect to the liquid mass applied to it, whether the liquid mass comprises organic or aqueous compositions or even reactive chemical compounds. It should be able to resist elastically a traction sufficient to maintain it under tension throughout the entire sheet-production process in spite of the substantial changes in temperature which it undergoes during the process. For example, to make a polyurethane sheet, the liquid mass is generally applied at relatively low temperatures, e.g. between 20° and 90° C. depending on the material to be cast, while the solidification of the liquid layer by evaporation of solvents and/or by polymerization of reactive components generally requires much higher temperatures, of the order of 120° C., for example. The ribbon should also be readily separable from the sheet formed on it, at least when an appropriate release agent is used, and it should be compatible with being wound onto or from bobbins or rollers. The aforementioned plastic films sold under the marks "TERPHANE" and "CELLOPHANE" are suitable materials, and typically have a uniform thickness of about 0.01 to 0.25 mm; for certain purposes the ribbon width may exceed 2 meters. These materials also have an elasticity sufficient to produce a slight elongation therein in response to the applied tensioning forces, so that the surface of the ribbon remains uniform despite substantial changes in the temperature at the ribbon.

The liquid mass applied to the ribbon in accordance with the invention can, for example, be formed from organic-based or water-based solutions or dispersions including materials such as, for example, monomers, prepolymers, and polymers, and also such materials in pure form or as mixtures capable of producing a sheet of good optical quality. The liquid mass can have any of a range of viscosities depending on the material, and may contain various additives such as spreading agents, adhesion promoters, anti-UV agents, antioxidants, dyes, etc.

The process is therefore applicable to the production of very diverse sheets of good optical quality or of other desired properties, and can be applied to advantage to the production of sheets used in laminated glazings, including sheets formed primarily from at least one layer of polyurethane, for example, to the production of a sheet containing a layer of self-healing thermoset polyurethane; local impressions disappear spontaneously from such a layer after a short period of time, on the order of a few minutes, the rate of disappearance depending on the nature of the impression and the temperature of the plastic material. At the same time, the layer can be anti-lacerative, meaning that in case of breakage of the glass glazing, the layer covers the sharp edges of the glass and protects the face, eyes and other parts of the body of the passengers of a vehicle for example, or in the case of safety goggles, the protective layer can prevent contact of the sharp edges with the eyes.

As described above in connection with FIG. 1, the process can be used to advantage in making an adhesive sheet capable of bonding chemically with the elements of a laminated glazing, and which consists primarily of a blocked polyurethane containing isocyanate groups masked by a blocking agent. Such a sheet is disclosed in aforementioned application Ser. No. 213,225. For example, the adhesive sheet can be formed primarily of a blocked polyurethane containing isocyanate groups masked by a blocking agent, the polyurethane being preferably dispersible or soluble in water and formed from a polyol compound, such as alcohols of functionality greater than or equal to 3, and an isocyanate compound, the numerical ratio of the NCO groups to the free OH groups being between 1.01 and 3. The use of alcohols with a functionality greater than or equal to 3 provides a polyurethane which includes some cross-linking.

To form this polyurethane, one may use as isocyanate compound aliphatic isocyanates, cycloaliphatic isocyanates, or aliphatic-aromatic isocyanates which are not sensitive to light and which may contain uric functions. Isocyanate biurets can be used also. Exemplary difunctional isocyanate are aliphatic isocyanates such as 1,6-hexanediisocyanate; 2,2,4-trimethyl-1,6-hexanediisocyanate; 1,3-bis-(isocyanate methyl)benzene; bis(4-isocyanatecyclohexyl)methane; bis(3-methyl-4-isocyanate cyclohexyl)methane; 2,2-bis(4-isocyanate cyclohexyl)propane; and 3-isocyanate methyl-3,5,5-trimethyl cyclohexylisocyanate.

Exemplary polyol compounds that can be used to form the blocked polyurethane are polyether diols or polyester diols of molecular weight between about 450 and about 2000 (those of higher molecular weight may cause a reduction in the adhesive properties of the polyurethane), polycaprolactones of molecular weight between about 500 and about 2000, polybutadienes with hydroxyl and/or carboxyl groups, short-chain diols of molecular weight between 50 and about 200, and cross-linking agents such as alcohols and amines of functionality greater than or equal to three, and molecular weights respectively of about 60 to about 300 and about 200 to about 1000. Exemplary active-hydrogen containing compounds include also polyols obtained by the reaction of polyfunctional alcohols with aliphatic diacids or cyclic ethers. The polyfunctional alcohols are, for example, 1,2-ethanediol, 1,2-propanediol, 1,3-butanediol, 1,4-butanediol, 2,2-dimethyl-1,3-propanediol, 1,6-hexanediol, 2-methyl-2,4-pentanediol, 3-methyl-2,4-pentanediol, 2-ethyl-1,3-hexanediol, 2,2,4-trimethyl-1,3-pentanediol, diethyleneglycol, triethyleneglycol, polyethyleneglycols, dipropyleneglycol, tripropyleneglycol, polypropyleneglycols, 2,2-bis(4-hydroycyalohexyl)propane, in some cases as a mixture, 1,2,3-propanetriol, 2,2-bis(hydroxymethyl)1-1 propanol, 2,2-bis(hydroxymethyl)-1-butanol (trimethylolpropane), 1,2,4-butenediol, 1,2,6-hexanetriol, 2,2-bis(hydroxymethyl)-1,3-propanediol and 1,2,3,4,5,6-hexanehexol cyclohexanedimethnaol.

Exemplary aliphatic diacids that can be used are malonic acid, succinic acid, glutaric acid, adipic acid, subaric acid, and sebacic acid.

One generally uses as the polyol compound at least one polyether polyol or polyester polyol formed from several diols and at least one cross-linking agent, such as alcohols or amines of functionality greater than or equal to 3. An adhesive layer of good optical quality is thus obtained which, after unblocking of the masked isocyanate groups, exhibits good adhesive properties.

Exemplary of the blocking agents that can be used to protect or mask the free isocyanate groups of the polyurethane are phenol, ortho, meta or para cresols and mixtures thereof, xylenol, resorcinol, hydroquinone, cathechol, guaiacol, naphthols, alkylphenols, such as butylphenols, octylphenol, nonylphenol, 2,4-diisobutylphenol and its derivatives, 4-hydroxybiphenyl, 6-hydroxytetraline, bisphenols such as isopropylidene-4-4'-bisphenol, lactams such as lauryl lactam, caprolactam, oximes such as methylethylketoxime, acetoxime, cyclohexanoneoxime, hydroxylamine, hydrocyanic acid, sodium bisulfate, tertiobutanol, diethylmalonate, ethylacetoacetate, 2,4-pentane-dione, acetylacetone, diphenylamine, monomethylaniline, aryl-mercaptans, alkyl-mercaptans, and 1-phenyl-3-methyl-5-pyrazolone.

Dissolution or dispersion in water can be ensured for anionic adhesives by the use of diols with an acid function, and for cationic adhesives by the use of diols with a nitrogen atom such as N-methyldiethanolamine, N-phenyldiethanolamine, and a dialkylaminoethylamine. These materials, which promote the water solubility or water dispersibility of the polyurethane can be used in a proportion of about 4 to about 9 by weight of the solution and preferably about 4.5 to about 7.5% by weight. Fine aqueous solutions or dispersions are thus made containing generally about 10 to about 65% of dry extract and preferably about 25% to about 45%.

A layer formed by means of the above components may be used as adhesive layer between the sheets of glass and/or plastics material. It may also be made so as to have energy-absorbing properties, and it may also be used for adhesion of the aforementioned thermosetting polyurethane layer to a glass or plastic substrate.

After application of the liquid mass and solidification of the layer or layers by evaporation of liquids such as solvents and/or by polymerization, the sheet so-formed is removed from the stretched pliant ribbon. This removal can be delayed and performed just prior to the time when the sheet is to be used. It is one of the features of a preferred embodiment of the invention that the plastic sheet material may be formed by casting on a stretched pliant ribbon which can be used subsequently as storage interlayer; thus the storage interlayer may be the ribbon itself, which for example is of polyethyleneglycol terephthalate or regenerated cellulose. It may also be a thin flexible film such as, for example, a film of poly(vinyl alcohol). In the latter case, after the plastic sheet has been made, it is removed from the stretched flexible substrate together with the film of poly(vinyl alcohol), the latter being separated from the sheet by washing, for example only when the sheet is ready to be used.

The casting line is distributed over several zones: generally, at least one zone for the pretreatment of the stretched pliant ribbon, at least one for the application of the liquid mass (casting zone), at least one zone for solidification of the deposited liquid mass and at least one zone for cooling prior to winding of the sheet so-formed.

Although it is preferred to use the edge wheels described above, in a variation of the invention the flexible ribbon may be stretched laterally by clamps which move simultaneously with and parallel to the ribbon.

In an alternative embodiment of the apparatus, the means which horizontally support the flexible ribbon over its useful width—that is to say the width covered by the liquid mass—at least in the area where the liquid mass is applied, may be rollers provided in indicated areas under the flexible ribbon and, if need be, in other areas along the casting line. However, the means which horizontally support the flexible ribbon are preferably metal plates or glass plates, themselves supported by adequate means, for example rollers or a supporting frame. This embodiment is advantageous because the plates serve to distribute the heat throughout the zones through conduction, and may be themselves heated by electrical resistance heaters, for example.

To avoid optical defects in the sheet due to the presence of foreign matter, the casting line may include means that prevent the grains of dust and other particles from being deposited on the sheet so-made and, possibly, on the ribbon, especially if the latter is used as a storage interlayer, plus cleaning means to eliminate those grains of dust already present. Physical screens can be used as means to avoid particle deposits. Thus, one can place the casting line as a whole, or component parts of this such as the casting and solidification zones, in a chamber supplied with dust-free filtered air.

The means to avoid particle deposits may include electrostatic rods 31 which ionize the atmosphere around the sheet. The means to clean the sheet may be brushes, blades that act like scrapers, and/or wiping elements, combined, if need be, with suction elements. In addition to the means which assure heating and thermal regulation of the ribbon on a zone-to-zone basis, the apparatus may also include means to ensure the unfolding of the flexible ribbon, for example, unfolding rollers, and other heating means located in the upstream portion of the production line.

Within the scope of the invention, the stretched pliant support ribbon can also be utilized as one of the elements entering into the composition of a multi-layered or composite sheet. For example, a composite sheet can be manufactured comprising a layer of polyethyleneglycol terephthalate coated with an anti-lacerative and self-healing layer of thermosetting polyurethane. The uncoated side of the casting support can later be provided with an adhesive layer. Advantageously, one can also use an anti-adhesive support having an adhesive side, and cast on the opposite face an anti-lacerative and self-healing layer. A composite sheet could also be manufactured which would adhere in situ to a support of glass or plastic material.

Considering now in more detail the pretreatment used in accordance with the invention to assure smoothness of the ribbon upstream of the position at which the liquid mass is dispensed into the ribbon, the primary significant factors are the temperature, time and tensions used in pretreatment. In general, and within limits, the higher the temperature, the longer the time, and the higher the tensions, the greater is the wrinkle and crease-removing effect. However, with only a small amount of heating and/or very low tensions, no discernible smoothing is obtained even with very long times; on the other hand, if the temperature is raised too high the ribbon material may soften or melt, and if the tension is made too high the ribbon may break.

For example, it has been found that with pretreatment temperatures of about 20°, no discernible smoothing effect is observed; even with tensions of the order of 1 to 10 da N/mm$^2$ applied longitudinally and laterally for 5–8 minutes, increase of the temperature to about 50° C. produces little increase in the surface smoothing action. However, using a pretreatment temperature of 80° C., excellent smoothing of the ribbon occurs.

From such tests and calculations it has been found that temperatures in the range of about 60° C. to 100° C. are effective for the purposes of the invention, 70° C. to 90° C. being the preferred range. Longitudinal and lateral tensions of about 1 to 7 da N/mm$^2$, or even higher, have been found suitable for use; in the case of a ribbon of about 23 $\mu$ thickness and 1.3 meters width having a cross-sectional area of about 30 mm$^2$, a longitudinal force of about 30 to about 210 da N has been found especially suitable, and with such a ribbon typically produces a 2–3% elastic elongation. When this lateral tension is provided by angled rollers, the center of the rollers are advantageously spaced from each other along the ribbon by about 10 cm., have a diameter of about 2 inches and a width of about one-half inch, have a rubber peripheral surface with a surface hardness of about 7° shore A, and have their axes at about 2°–4° from the normal to the length of the ribbon; the opposed rollers of each pair are preferably urged toward each other to produce a pressure on the intervening ribbon typically of about 1.5 to 7.5 Kg wgt., the pressure preferably being near the top of the latter range.

FIG. 6 illustrates schematically another form of oven system which has been found especially advantageous in some application. Instead of a single oven chamber maintained at one uniform temperature, it uses two adjacent successive chambers 100 and 102 providing an increase in oven temperature along the direction of advancement of the ribbon 2. In a preferred embodiment the region in the first chamber 100 adjacent the ribbon is maintained at about 70° C. while the corresponding region in the second chamber is maintained at about 90° C.

When as in the preferred embodiment the lateral tension is provided by rollers, significant factors in obtaining the desired tension are the force with which the opposed rollers of each pair bear against the ribbon, the angle $\alpha$ of the axis of rotation of the rollers with respect to the normal to the direction of motion of the ribbon, and the size, hardness and frictional properties of the rollers. Referring to FIG. 7, if F is the force which the ribbon exerts on the roller along the direction of ribbon motion, then the component $F_R$ of F along the direction of pure rolling of the roller equals F cos $\alpha$, and the component at right angle to $F_R$ along the direction of pure sliding is $F_S$. The tensioning force exerted by the roller, assuming no sliding, is then proportional to $F_R \sin \alpha = F \sin \alpha \cos \alpha = F/2 \sin 2\alpha$. This function has a maximum at $\alpha = 45°$ and is zero along and at right angles to the direction of ribbon travel. However, in general, it is important also that the roller roll, and not slide substantially, over the underlying ribbon. For any angle $\alpha$ greater than zero and less than 180° there will be a component acting between ribbon and roller tending to cause undesirable sliding of the ribbon across the roller, and for any angle other than 90° there is a component tending to produce the desired rolling of the roller. Sliding tends to begin when the pure sliding component $F \sin \alpha$ first exceeds $P\beta$, where P is the pinching force exerted by a pair of the rollers on the ribbon and $\beta$ is the coefficient of sliding, which depends on the frictional characteristics of the terphane and of the surface of the rollers; with given materials, the angle $\alpha$ can be increased from zero toward 45° without producing sliding by increasing the pinching force P, within reasonable limits. The reaction forces which the roller exerts on the ribbon are of course opposite to those which the ribbon exerts on the roller, and produce the desired lateral tensioning.

Accordingly, while the invention has been described with particular reference to specific embodiments in the interest of complete definiteness, it will be understood that it may be embodied in a large variety of forms diverse from those specifically shown and described without departing from the spirit and scope of the invention as defined by the appended claims.

What is claimed is:

1. A process for making a polyurethane-based material-containing plastic sheet of good optical quality, comprising:
    (i) subjecting an originally creased or wrinkled pliant ribbon of thin plastic material to lateral and longitudinal tensioning of at least about 1 da N/mm² while preheating the ribbon to a temperature in the range of about 70° to 90° C. for at least one minute, thereby substantially removing wrinkles and creases from the ribbon, wherein said pliant ribbon of plastic material has a width of from about one to several meters and a thickness of about 0.01 to 0.25 mm, and is made of a material selected from the group consisting of polyethylene glycol terephthalate, poly(vinylalcohol) and regenerated cellulose;
    (ii) depositing a layer of polyurethane from a liquid reactive mixture of monomers directly onto said ribbon;
    (iii) polymerizing the layer of polyurethane by heating; and
    (iv) obtaining a plastic sheet of good optical quality.

2. The process of claim 1, comprising moving said ribbon continuously along the direction of its length through a preheating station at which said preheating and tensioning is applied, and through a deposition station where said liquid hardenable polyurethane-based material is deposited on said ribbon.

3. The process of claim 2, wherein said preheating comprising heating said ribbon to about 70° C. in a first, upstream portion of the preheating station, and, thereafter to a temperature of about 90° C. in a second, downstream portion of said preheating station.

4. The process of claim 1, wherein said tensioning is of a magnitude of at least about 1 dekanewtons per mm² of ribbon cross-section in all directions parallel to the major surfaces of said ribbon.

5. The process of claim 4, wherein said tensioning is of a magnitude of from about 1.5 to 7.5 dekanewtons per mm².

6. The process of claim 1, wherein said ribbon is made of polyethylene terephthalate, said ribbon is preheated to a temperature in the range of about 70° to 90° C. for from 1 minute to 10 minutes, and wherein said ribbon is subjected to tensioning in all lateral directions while traveling from said heating station to said deposition station.

7. The process of claim 1, wherein said pliant ribbon is made of polyethylene glycol terephthalate.

8. The process of claim 1, wherein said pliant ribbon support is supported by a glass plate.

9. The process of claim 1, wherein said preheating is effected for about 5 to 8 minutes.

10. The process of claim 1, wherein said ribbon is subjected to lateral and longitudinal tensioning of a magnitude of from about 1.5 to 7.5 dekanewtons per mm².

11. The process of claim 1, wherein said lateral tension is applied by means of pair of opposed idler rollers positioned along opposite side edges of the moving ribbon biased toward each other, thereby pinching the ribbon between them, with the roller axes angled about 2° to 5° outwardly from a direction normal to the direction of travel of the ribbon.

* * * * *

UNITED STATES PATENT AND TRADEMARK OFFICE
CERTIFICATE OF CORRECTION

PATENT NO. : 5,268,136
DATED : December 7, 1993
INVENTOR(S) : Philippe Girard et al.

It is certified that error appears in the above-indentified patent and that said Letters Patent is hereby corrected as shown below:

On the title page, Item [63],

The Related U.S. Application Data should read:

--Continuation of Ser. No. 384,060, Jul. 24, 1989, abandoned, which is a continuation of Ser. No. 102,792, Sep. 23, 1987, abandoned, which is a continuation of Ser. No. 842,370, Mar. 19, 1986, abandoned, which is a continuation of Ser. No. 673,833, Nov. 21, 1984, abandoned, which is a continuation-in-part of Ser. No. 589,047, Mar. 14, 1984, abandoned, which is continuation of Ser. No. 252,589, Apr. 9, 1991, abandoned--.

Signed and Sealed this

Fourth Day of July, 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO.   : 5,268,136
DATED        : December 7, 1993
INVENTOR(S)  : Philippe Girard et al It is certified that error appears in the above-indentified patent and that said Letters Patent is hereby corrected as shown below:

On the title page, item [63], The Related U.S. Application Data should read:

--Continuation of Ser. No. 384,060, Jul. 24, 1989, abandoned, which is a continuation of Ser. No. 102,792, Sep. 23, 1987, abandoned, which is a continuation of Ser. No. 842,370, Mar. 19, 1986, abandoned, which is a continuation of Ser. No. 673,833, Nov. 21, 1984, abandoned, which is a continuation-in-part of Ser. No. 589,047, Mar. 14, 1984, abandoned, which is continuation of Ser. No. 252,589, Apr. 9, 1981, abandoned--.

This certificate supersedes Certificate of Correction issued July 4, 1995.

Signed and Sealed this

Fifteenth Day of August, 1995

Attest:

BRUCE LEHMAN

*Attesting Officer*        *Commissioner of Patents and Trademarks*